(12) United States Patent
Kang

(10) Patent No.: US 6,902,203 B2
(45) Date of Patent: Jun. 7, 2005

(54) EXHAUST PIPE DECOUPLER FOR VEHICLES

(75) Inventor: Choon Ki Kang, Ansan (KR)

(73) Assignee: SJM Co., Ltd. (KR)

( * ) Notice: Subject to any disclaimer, the term of this patent is extended or adjusted under 35 U.S.C. 154(b) by 0 days.

(21) Appl. No.: 10/362,858

(22) PCT Filed: Feb. 6, 2001

(86) PCT No.: PCT/KR01/00173

§ 371 (c)(1),
(2), (4) Date: Feb. 26, 2003

(87) PCT Pub. No.: WO02/18755

PCT Pub. Date: Mar. 7, 2002

(65) Prior Publication Data

US 2004/0036281 A1 Feb. 26, 2004

(30) Foreign Application Priority Data

Aug. 28, 2000 (KR) .......................... 2000-50100

(51) Int. Cl.[7] ................................. F16L 13/02
(52) U.S. Cl. ...................... 285/226; 285/301; 285/49
(58) Field of Search .................. 285/49, 226, 299, 285/300, 301; 92/41, 45, 46

(56) References Cited

U.S. PATENT DOCUMENTS

| | | | | |
|---|---|---|---|---|
| 1,993,984 A | * | 3/1935 | Wulle et al. | 285/222.1 |
| 2,444,988 A | * | 7/1948 | Guarnaschelli | 285/55 |
| 2,666,657 A | * | 1/1954 | Howard et al. | 285/49 |
| 3,029,094 A | * | 4/1962 | Parlasca et al. | 285/114 |
| 3,232,640 A | * | 2/1966 | Donkle, Jr. | 285/93 |
| 3,420,553 A | * | 1/1969 | Poxon et al. | 285/49 |
| 5,145,215 A | * | 9/1992 | Udell | 285/49 |
| 5,437,479 A | * | 8/1995 | Hartling et al. | 285/49 |
| 5,660,419 A | * | 8/1997 | Kim | 285/226 |
| 5,769,464 A | * | 6/1998 | DeBlasi et al. | 285/226 |
| 5,791,697 A | * | 8/1998 | Godel et al. | 285/300 |
| 5,797,628 A | * | 8/1998 | Kuhn | 285/49 |
| 5,806,899 A | * | 9/1998 | Norikawa et al. | 285/299 |
| 5,813,704 A | * | 9/1998 | Naito | 285/226 |
| 5,842,723 A | * | 12/1998 | Hartling et al. | 285/49 |
| 5,967,193 A | * | 10/1999 | Nagai et al. | 138/110 |
| 6,047,993 A | * | 4/2000 | Jungbauer | 285/49 |
| 6,151,893 A | * | 11/2000 | Watanabe et al. | 60/322 |
| 6,230,748 B1 | * | 5/2001 | Krawietz et al. | 138/121 |
| 6,240,969 B1 | * | 6/2001 | Wildermuth | 138/122 |
| 6,296,282 B1 | * | 10/2001 | Burkhardt et al. | 285/49 |
| 6,354,332 B1 | * | 3/2002 | Burkhardt et al. | 138/109 |
| 6,354,632 B1 | * | 3/2002 | Jung et al. | 285/49 |
| 6,554,321 B1 | * | 4/2003 | Boisseau et al. | 285/49 |

FOREIGN PATENT DOCUMENTS

| | | |
|---|---|---|
| DE | 19744663 | 4/1998 |
| EP | 0709558 | 5/1996 |
| JP | 10311217 | 11/1998 |

* cited by examiner

Primary Examiner—Eric K. Nicholson
(74) Attorney, Agent, or Firm—Madson & Metcalf

(57) ABSTRACT

An exhaust pipe decoupler for vehicles including a bellows (10), an outer braid member (20) spaced from the bellows and braided with a predetermined angle, a retainer (30) having a support (31) inwardly curved at both ends thereof for engaging to a ring damper (40), the retainer being affixed to the ends of the bellows (10) and installed between the outer surface of the bellows (10) and the outer braid member (20) to prevent direct contact thereof, the ring damper (40) located outward the support (31) formed in the retainer (30), a fixing cap (50) coupled to the outer diameter of the outer braid member (20) in order that the outer braid member (20) and the retainer (30) are located outward the bellows (10), wherein the outer braid member (20) absorbs tension in excessive outer forces, i.e., displacement of tension and compression, and the ring damper (40) controls the displacement of compression and shear displacement by the ring damper (40), thereby controlling the bellows within the elastic range.

10 Claims, 4 Drawing Sheets

US 6,902,203 B2

EXHAUST PIPE DECOUPLER FOR VEHICLES

TECHNICAL FIELD

The present invention relates to an exhaust pipe coupler for vehicles, and more particularly, an exhaust pipe coupler wherein a ring-shaped damper affixed by a retainer is inserted into the interior of the outer braid member in an exhaust system for vehicles, for reducing excessive outer forces and displacement applied to the bellows to improve durability of the bellows.

BACKGROUND ART

It is well known that vehicle engines are coupled to the exhaust pipe employing a muffler for exhausting the exhaust gas from the vehicle and the coupler acts to absorb and buffer the vibration displacement, impact load or heat deformation.

The coupler on this location should be mounted to absorb engine and road vibrations and displacement. There is a possibility of excessive displacement in any direction, such as tension compression, bending or deflection.

In order to improve absorbing capability of the vibration displacement and maintain airtightness of the coupler of vehicles, the coupler usually includes bellows fabricated from metal.

Various types of the exhaust pipe couplers have been known and one of them is described in U.S. Pat. No. 5,145,215, which shows a flexible coupler apparatus in a compact, simple structure.

In U.S. Pat. No. 5,145,215, both ends of the inner and outer sleeve members, each coupled to the engine and exhaust pipes, in a hollow cylindrical shape are curved on the ends to form rims. Air gaps are shown between rims and inner sleeve member and between inner and outer sleeve members.

A flexible bellows for absorbing the displacement in longitudinal is affixed to the opposite ends of the inner and outer sleeve members.

Caps are outwardly fixed on the ends of the sleeve members and the bellows. A metal wire braid is wrapped around the bellows.

A displacement portion is formed at the intermediate overlapping position of the inner and outer sleeve members, which is elongated and bent, so that the bending displacement in overlapping state of the central axis angle with respect to the exhaust pipe coupler and flexible displacement in longitudinal direction from impact in engine vibration or travelling are absorbed by air gap between the rims and the bellows.

EP 0410089A1 shows a coupler of metal for absorbing expansion or deflection, including bellows. An interlock member is included in the bellows, which functions to absorb expansion or deflection, control displacement within the elastic range, guide the exhaust gas and protect the bellows from exhaust gas of high temperature.

The bellows and braid members thereon are circumferentially affixed to each end by caps together.

One end is coupled to the engine and the other end is coupled to the exhaust pipe for allowing the exhaust gas to pass in the exhaust pipe. Impact or deformation to the engine and the exhaust pipe is absorbed by the bellows and the interlock member.

A fixing means for coupling the opposite ends of the bellows and the interlock member is an important element for determining lifetime of the flexible coupling for exhaust pipe.

The interlock member in spiral may cause problems regarding durability and noise, dependent on the closing method of the opposite ends.

The applicant has suggested an improvement of a flexible tube for coupling exhaust pipe in Korean Utility Model Registration No. 101514, UM Appln. No. 94-36920, including an intermediate member for a fixing means for coupling the opposite ends of the interlock member and the bellows.

The exhaust pipe coupler mainly depends on the metal bellows of good capability to absorb the vibration displacement and keep airtightness. However, excessive displacement and heavy stress on the bellows itself result in low controlling capability.

An outer braid member is mounted outward on the bellows, which functions to keep superior durability in elastic range in each direction with respect to the bellows.

Since the commonly-used one fold outer braid member is made of stainless wire net, it is disadvantageous to insufficiently control excessive power or displacement in tension or compression direction unless the outer braid member is stick to the outer surface of the bellows.

In case that the outer braid member is stick to the bellows, tension forces are controlled but compressive forces are not controlled. This may cause the bellows to be easily worn out depending on the extent of tightness, resulting in short lifetime.

DISCLOSURE OF THE INVENTION

The present invention has an object to provide a vehicle exhaust pipe coupler for reducing displacement and excessive outer forces applied to the bellows and improve durability of the bellows by inserting a ring-shaped damper member fixed by a retainer into the interior of outer braid member on the bellows.

Another object of the present invention is to provide a vehicle exhaust pipe coupler in which vehicle body coupling joint and resonance of the exhaust system are controlled to adapt to the vehicle, by adequately controlling resonance and damping characteristics of the bellows.

Further object of the present invention is to provide a vehicle exhaust pipe coupler with high productivity and reliability.

In order to achieve the objects of the present invention, there is provided an exhaust pipe coupler for vehicles, comprising a bellows 10 made of metal and formed in cylindrical and a repeatedly corrugated shapes; an outer braid member 20 braided at a predetermined angle for wrapping around the bellows 10 with a predetermined space from the bellows 10; a retainer 30 having a support 31, inwardly curved at each end thereof for receiving a ring damper 40, the retainer being affixed to both ends of the bellows 10 and mounted between the outer surface of the bellows 10 and the outer braid member 20 to prevent direct contact thereof; a ring damper 40 disposed outward the support 31 formed at the retainer 30; and a fixing cap 50 fitted into the outer diameter of the outer braid member 20 in order that the outer braid member 20 and the retainer 30 are affixed outward the bellows 10.

In case that heavy outer forces, i.e., tension and compression displacements are applied to the bellows 10, a ring damper 40 is mounted outward the retainer 30 fixed between the outer braid member and the bellows 10 in order to control movement of the bellows 10 within the elastic range, so that motion of the excessive tension forces are controlled by the outer braid member 20 with a predetermined angle and motion of the excessive compression and shearing forces by the ring damper 40 are controlled, thereby improving durability in deformation and displacement from the excessive outer forces applied to the bellows 10. Productivity and reliability are improved as well.

BRIEF DESCRIPTION OF THE DRAWINGS

The present invention will be described in detail through use of the accompanying drawings in which.

BEST MODE FOR CARRYING OUT THE INVENTION

Figure 1:
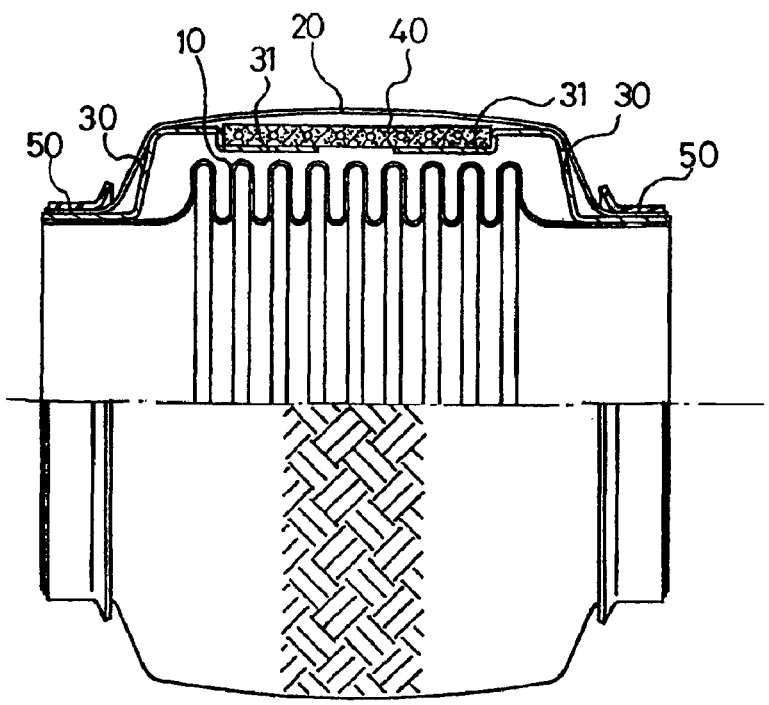
FIG. 1 is a sectional view of the exhaust pipe coupler of the present invention.
Figure 2:
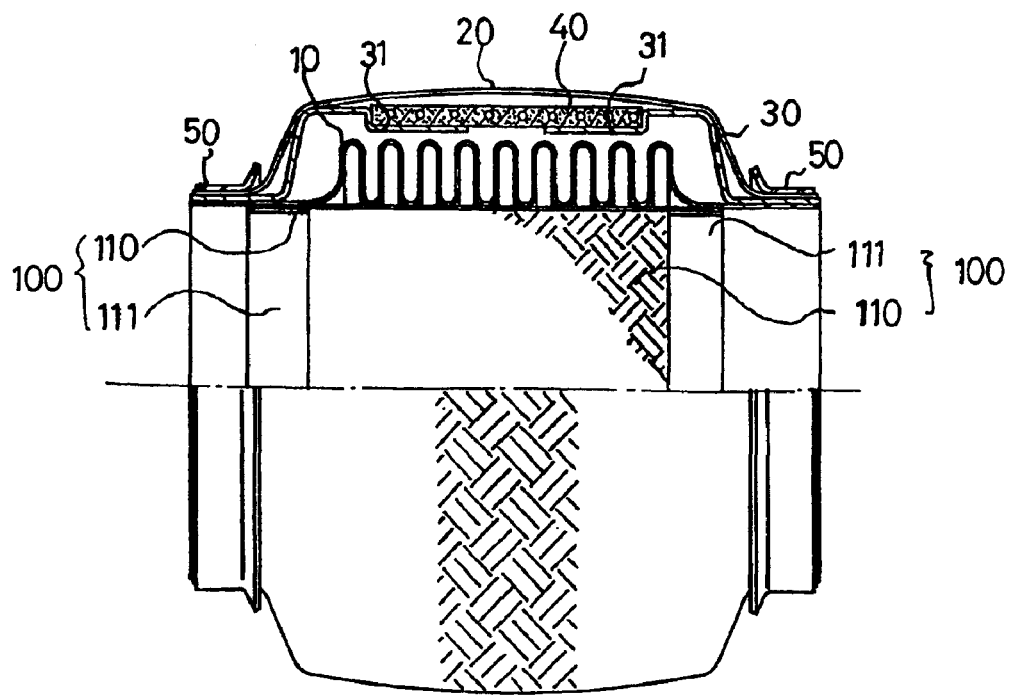
FIGS. 2 to 4 show the embodiments of the guide member mounted interior of the bellows of the present invention.
Figure 3:
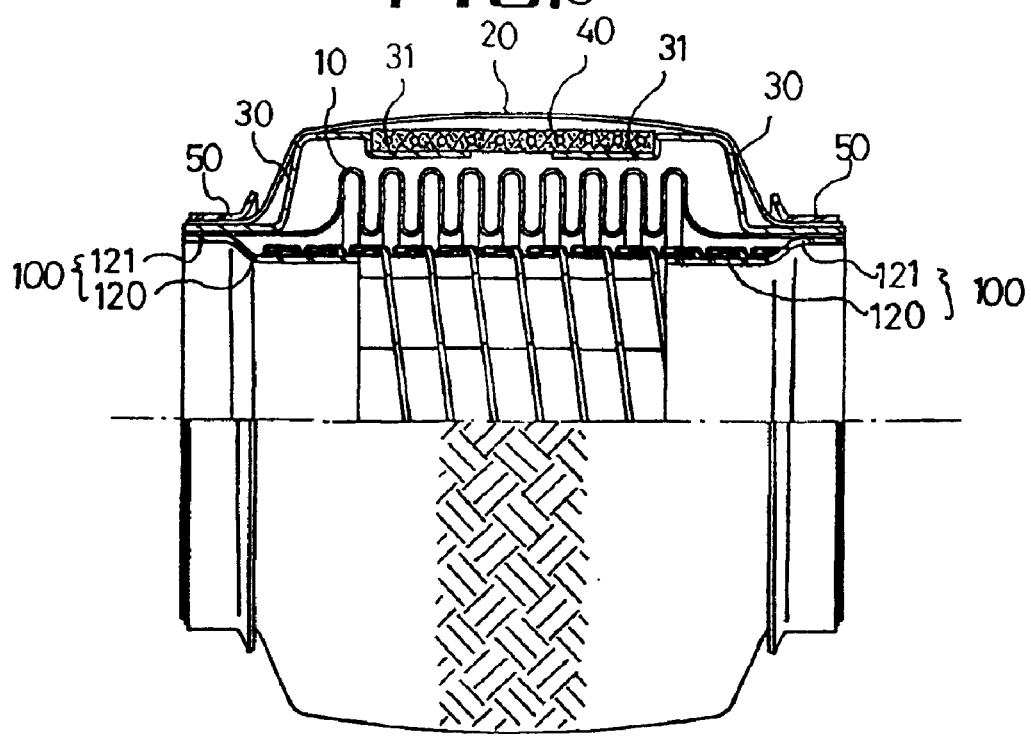
Figure 4:
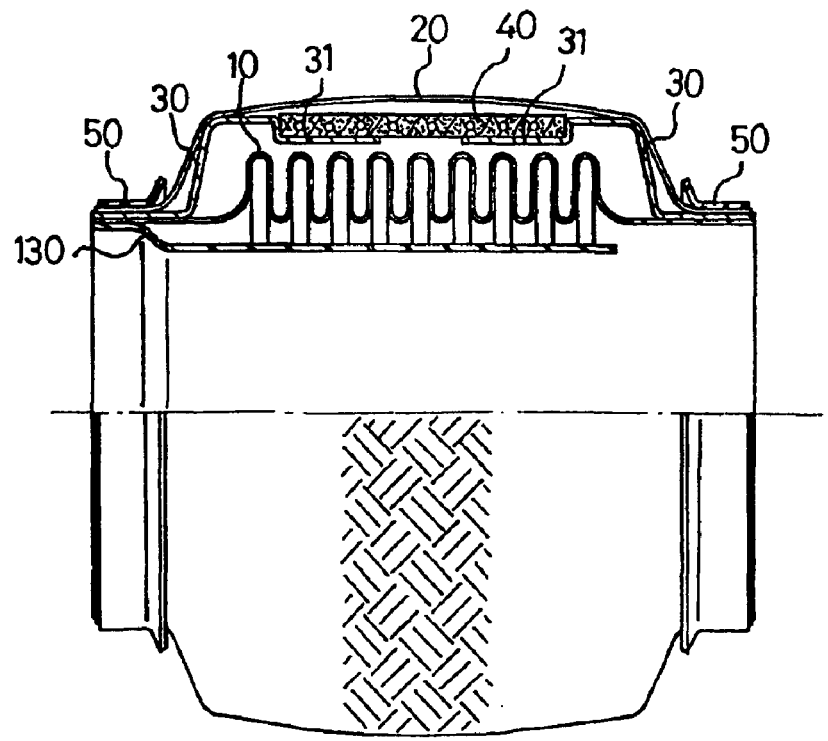
Figure 5:
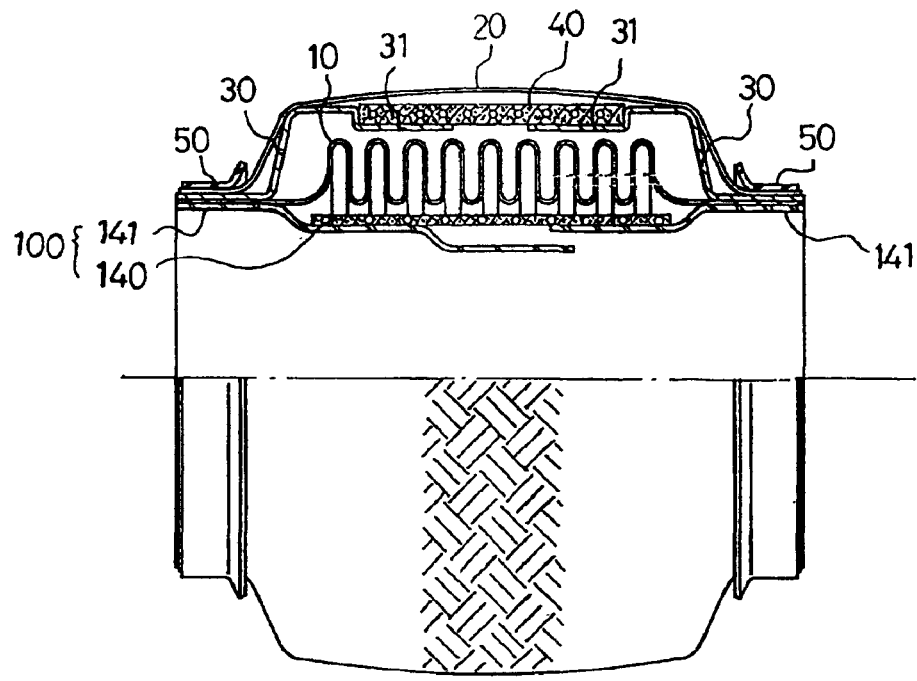
FIG. 5 is a sectional view of the inner ring damper mounted on the coupler of FIG. 1.
Figure 6:
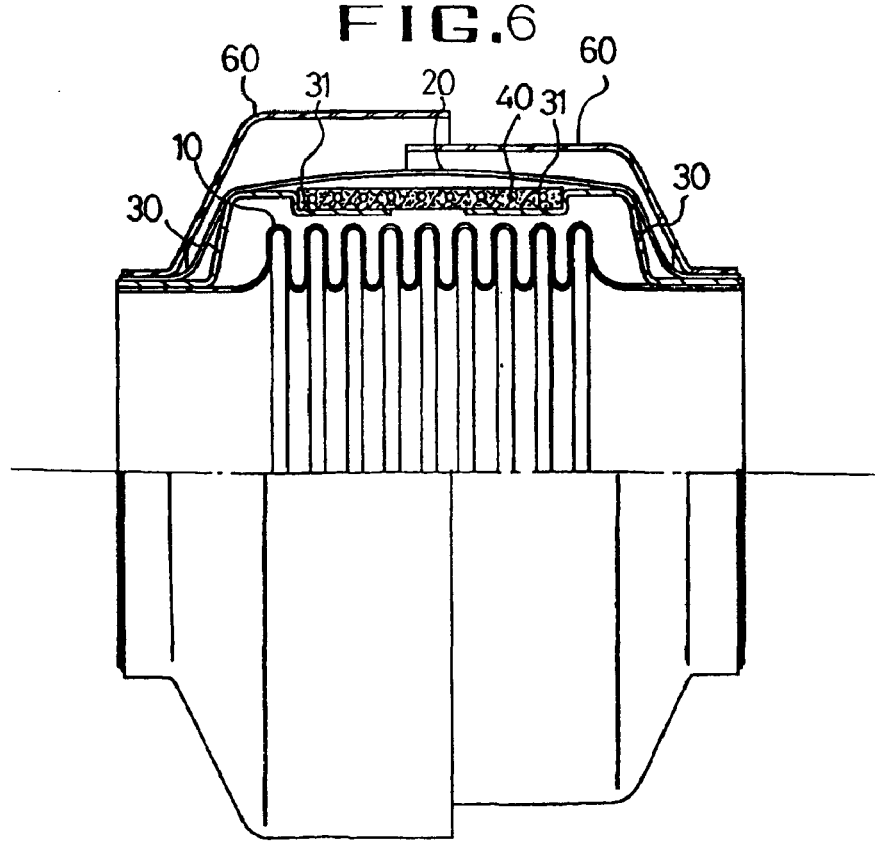
FIG. 6 is a sectional view with the protecting covers at each end of the outer braid member mounted on the coupler of FIG. 1.
Figure 7:
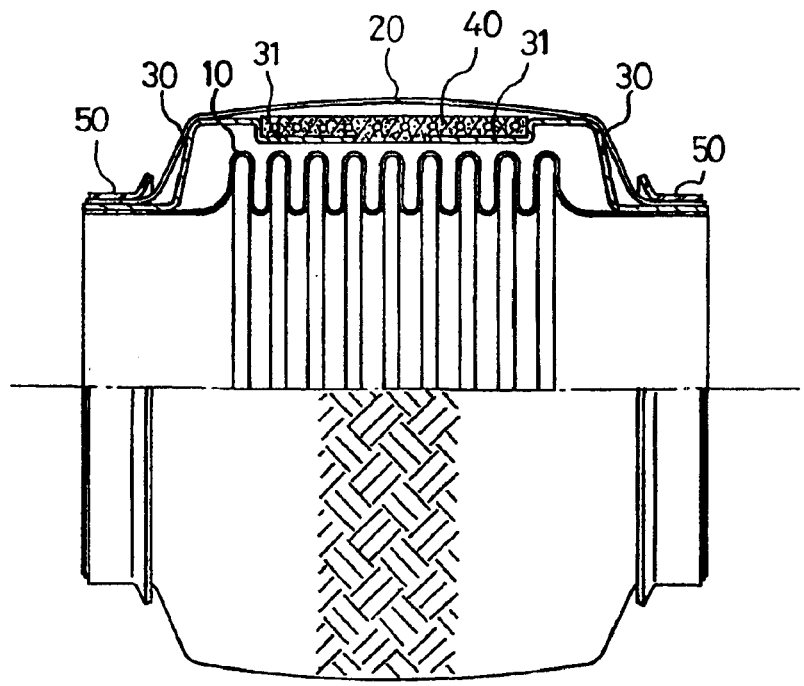
FIG. 7 is a sectional view in which the ring damper fills the middle of retainers.
Figure 8:
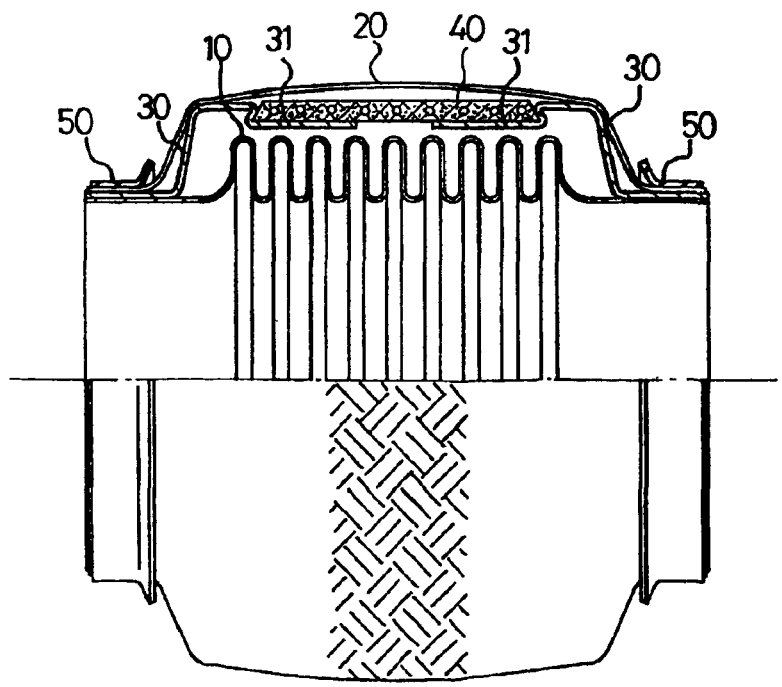
FIG. 8 is a sectional view showing the ring damper on the retainers to correspond the ends of the ring damper with the receiving section on which the ring dampers are received.

The presently preferred embodiments of the invention will be best understood by reference to the drawings in which: FIG. 1 is a sectional view of the exhaust pipe coupler of the present invention; FIG. 2 is a sectional view with the inner braid member of the present invention; FIG. 3 is a sectional view with the interlock member of the present invention; FIG. 4 is a sectional view with the sleeve member for guiding the exhaust gas; FIG. 5 is a sectional view of the inner ring damper; FIG. 6 is a sectional view with the a protecting cover at each end of the outer braid member; FIG. 7 is a sectional view in which the ring damper fills the interval in the middle of retainers fixed at opposite ends of the bellows; and FIG. 8 is a sectional view showing the ring damper on the retainers to form slant of the ends of the ring damper and the support on which the ring dampers are seated.

Referring to FIG. 1, a bellows 10 cylindrically formed in a repeatedly corrugated shape is made to absorb the displacement in axial or bending direction and restore the original shape when the outer forces are removed.

Outwardly disposed from the bellows 10 is an outer braid member 20. The outer braid member 20 is spaced for a predetermined clearance from the bellows 10, wrapped around the bellows 10 and made to elastically deform the tension forces.

A retainer 30 between the outer braid member 20 and the bellows 10 is affixed at each end with the bellows. The retainer 30 includes a support 31 and each end of the retainer 30 is bent to receive the support 31 to preclude direct contact of the bellows 10 and the outer braid member 20 due to tension displacement by maintaining the clearance between the bellows 10 and the outer braid 20.

The present invention suggests a ring damper 40 by a support 31 at each end of the retainer 30, for controlling compression and clipping displacements.

Engine vibration, vibrations from road condition in travelling, tension compression in motion of the exhaust system, and excessive displacement in each direction from bending and torsion have been applied to the bellows 10 to cause low durability. Mounting a ring damper 40 on the retainer 30 between the bellows 10 and the outer braid member 20 solves this disadvantage. The ring damper 40 functions to limit the displacement in clipping direction and compressive forces, thereby controlling the bellows 10 within the elastic range of the bellows 10 to prevent low durability.

Mounting the ring damper 40 contributes to improve air tightness and vibration displacement absorbing capability. The increased damping effect at the resonance point allows the noise to be much reduced.

In order to firmly affix the outer braid member 20 and the retainer 30 on the bellows 10 a fixing cap 50 is engaged to insert to the outer braid member 20 and the bellows 10.

The fixing cap 50 functions to maintain a predetermined clearance on the retainer 30 and the outer braid member 20 from the bellows 10, and acts as an intermediate member to fix on the bellows, ultimately by welding on the bellows 10.

Outwardly from the outer braid member 20, a cover member 60 is disposed to wrap the outer braid member 20, for preventing corrosion from gas or alien substance. The cover member 60 may be disposed and fixed at one end or both ends, two cover members being spaced with a predetermined distance for engagement.

The ring damper 40 may be formed in various shapes. FIG. 7 shows the ring damper 40 protruded downward at the center thereof to support the ends of the retainer 30 fixed with the ends of the bellows 10, in order to increase resistance in the compression direction.

The curved portion of the support 31 at the end of the retainer 30 is formed to have a predetermined inner slant (FIG. 8). The ends of the ring damper 40 are formed to couple to the slant side of the support 31, thereby preventing the ring damper 40 in the support 31 from being deviated.

If it is desired to change resonance frequency and damping efficiency, density and shape of the ring damper 40 may be modified or the superimposing number of the outer braid member 20 or thickness of braided wire may be modified to control the necessary function.

Shape of the ring damper 40 and the retainer 30 may be modified depending on the exhaust system tube to be applied.

In case that excessive outer forces are applied to the ring damper 40, the outer braid member 20 wrapped around the bellows 10 is formed in a double braid: outward outer braid member is formed of an obtuse angle; and inward outer braid member is formed of an acute angle, so that resistance to tension and compression is increased.

In a double outer braid member, the outward outer braid member of an obtuse angle controls motion of displacement by compression, excessive outer forces applied to the bellows 10.

The inward outer braid member of an acute angle is located to control motion of the bellows 10 from excessive tension.

In case that the excessive outer forces the ring damper 40 cannot hold are applied, a double outer braid member formed of an obtuse angle and an acute angle enables the outer forces applied to the bellows 10 to be controlled within the range of displacement of elastic range of the bellows, and as a result durability of the bellows 10 is increased.

A guide member 100 absorbs expansion or deformation and controls displacement within the elastic range of the bellows 10. The guide member 100 acts to guide the exhaust gas and protect the bellows 10 from the exhaust gas of high temperature.

For the guide member 100, an inner braid member 110, interlock member 120 or inner sleeve member for guiding the exhaust gas may be selected.

The inner braid member 110 made of stainless wire net is fixed by using a belt 111 in cylindrical direction inward the bellows 10.

When the inner braid member 110 receives axial or bending displacement, the inner braid member 110 causes damping effect by friction from a double wire braid net when the opposite ends are fixed. The inner braid member 110 mounted in the bellows 10 in a hollow cylindrical shape prevents exhaust noise or resistance by the bellows 10, so that durability of the bellows 10 is improved.

The interlock member 120 is disposed to keep a predetermined gap from inward the bellows 10, wound in spiral, to absorb deformation in longitudinal and bending direction.

Outward the bellows 10 the ring damper 40 may be inserted between the outer braid member 20 and the bellows 10 in order to absorb or control displacement by outer forces on the bellows. Alternatively, the interlock 120 may be mounted interior of the bellows 10 for absorbing deformation in the longitudinal and bending direction, so that durability is increased.

The interlock 120 is coupled to ring-shaped interlock fixing sleeve 121 and firmly affixed inward the bellows 10.

One end of the interlock fixing sleeve 121 is partially superimposed and bent inward the interlock 120 and spot-welded to couple the bellows 10 with the interlock 120.

The guide member 100 for protecting the bellows 10 (FIG. 4) may include a cylindrical inner sleeve member 130 for passing the exhaust gas of high temperature.

The inner sleeve member 130 for guiding the exhaust gas is bent to partially superimpose with the end of the bellows 10 to fix by spot-welding, thereby increasing durability of the bellows 10.

For the guide member the inner ring damper 140 may be inserted, which performs damping function to absorb vibration displacement and controlling function for excessive compressive and shearing forces.

Since the inner ring damper 140 is inserted into the outer surface of an inner ring damper fixing sleeve 141 fixed at the inner opposite ends of the bellows 10, the exhaust gas is guided by the inner ring damper fixing sleeve 141 and the bellows is protected by the ring damper 140.

In case that heavy outer forces, i.e., tension and compression displacements are applied to the bellows 10, the ring damper 40 is mounted outward the retainer 30 fixed between the outer braid member and the bellows 10 in order to control movement of the bellows 10 within the elastic range, so that motion of the excessive tension forces are controlled by the outer braid member 20 with a predetermined angle and motion of the excessive compression and shearing forces by the ring damper 40 are controlled, thereby improving durability in deformation and displacement from the excessive outer forces applied to the bellows 10. Productivity and reliability are improved as well.

What is claimed:

1. An exhaust pipe coupler for vehicles, comprising:
   a bellows made of metal and formed in a cylindrical and a repeatedly corrugated shape;
   an outer braid member braided at a predetermined angle for wrapping around the bellows (10) with a predetermined space from the bellows;
   a retainer having a support, inwardly curved at each end thereof for receiving a ring damper, the retainer being affixed to both ends of the bellows and mounted between an outer surface of the bellows and the outer braid member to prevent direct contact thereof;
   a ring damper disposed outward the support formed at the retainer; and
   a fixing cap fitted into an outer diameter of the outer braid member in order that the outer braid member and the retainer are affixed outward the bellows.

2. The exhaust pipe coupler for vehicles according to claim 1, wherein the ring damper forms an inward bending portion at the center thereof to improve resistance in a compression direction.

3. The exhaust pipe coupler for vehicles according to claim 1, wherein the support of the retainer is inwardly curved at both ends of the retainer and the ends of the ring damper form a corresponding slant to engage with the curved end portions of the support.

4. The exhaust pipe coupler for vehicles according to claim 1, wherein a cover member is located outward the outer braid member.

5. The exhaust pipe coupler for vehicles according to claim 1, wherein the outer braid member includes an outward outer braid member of an obtuse angle and an inward inner braid member of an acute angle.

6. The exhaust pipe coupler for vehicles according to claim 1, wherein a guide member is mounted in the bellows for absorbing deformation such as bending and expansion and controlling the displacement within the elastic range of the bellows to guide the flow of exhaust gas and protect the bellows from the exhaust gas of high temperature, thereby improving durability of the coupler.

7. The exhaust pipe coupler for vehicles according to claim 6, wherein an inner braid member is mounted for the guide member.

8. The exhaust pipe coupler for vehicles according to claim 6, wherein an interlock member is mounted for the guide member.

9. The exhaust pipe coupler for vehicles according to claim 6, wherein an inner sleeve member is provided with the guide member.

10. The exhaust pipe coupler for vehicles according to claim 6, wherein an inner ring damper is inserted to the guide member.

* * * * *